Oct. 29, 1935.                K. P. BRACE                2,019,290
                        HEATING AND COOLING SYSTEM
                  Filed April 24, 1933        4 Sheets-Sheet 1

INVENTOR-
Kemper P Brace
BY Brown, Jackson, Boettcher & Dienner
ATTORNEYS.

Oct. 29, 1935.  K. P. BRACE  2,019,290
HEATING AND COOLING SYSTEM
Filed April 24, 1933  4 Sheets-Sheet 2

INVENTOR-
Kemper P Brace
BY Brown, Jackson, Boettcher & Dienner,
ATTORNEYS.

Oct. 29, 1935.                K. P. BRACE                 2,019,290
                    HEATING AND COOLING SYSTEM
                       Filed April 24, 1933          4 Sheets-Sheet 3
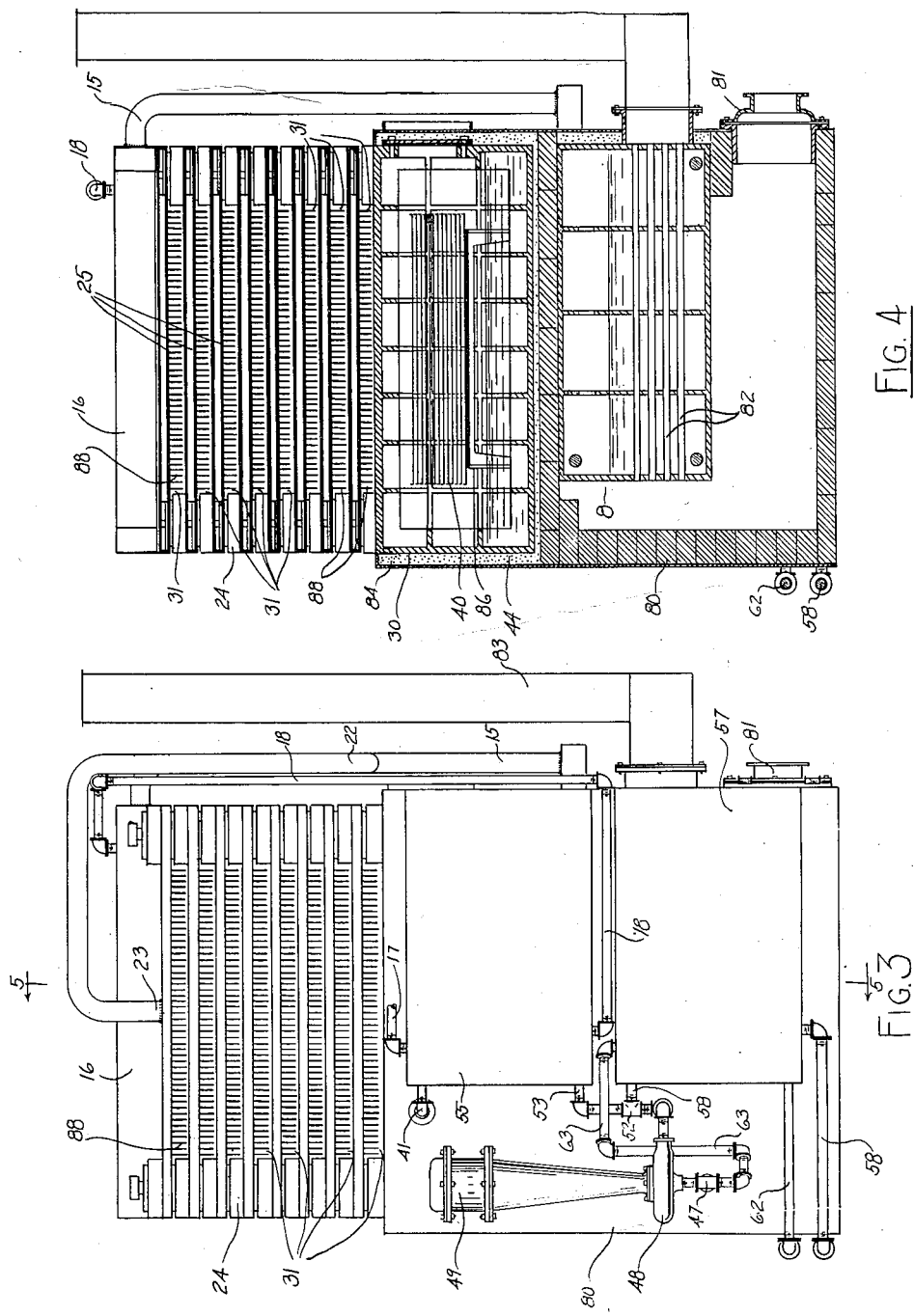
INVENTOR-
Kemper P Brace
BY Brown, Jackson, Boettcher & Dienner
ATTORNEYS.

Oct. 29, 1935.　　　　K. P. BRACE　　　　2,019,290
HEATING AND COOLING SYSTEM
Filed April 24, 1933　　　4 Sheets-Sheet 4
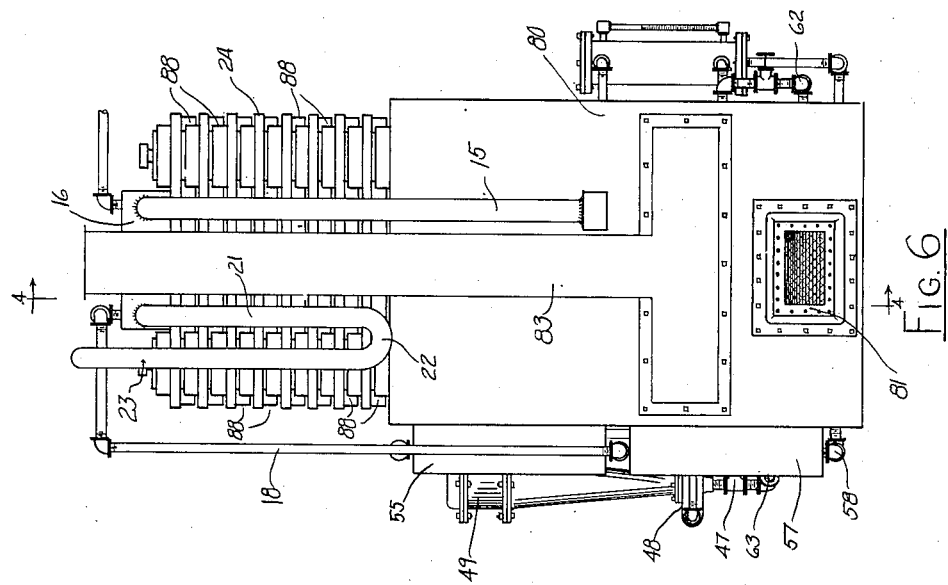
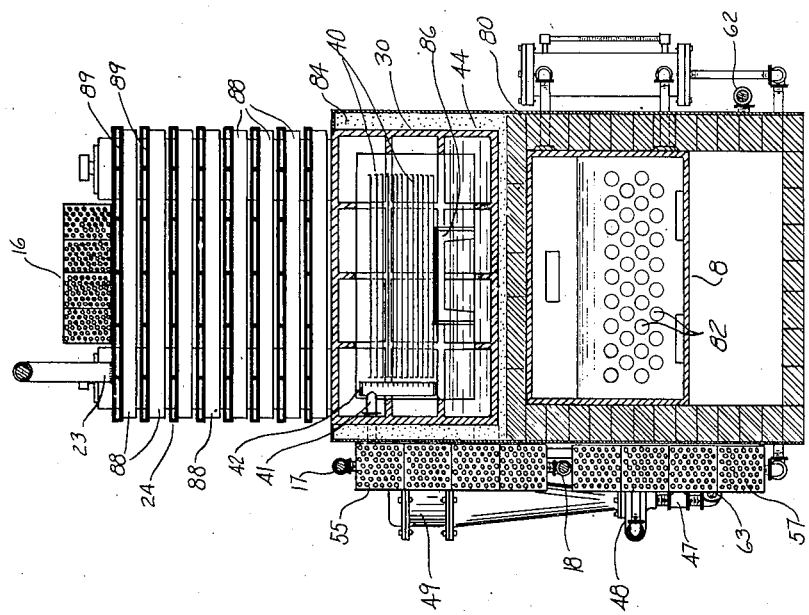
INVENTOR-
Kemper P. Brace
BY *Brown, Jackson, Boettcher & Dienner*
ATTORNEYS.

Patented Oct. 29, 1935

2,019,290

UNITED STATES PATENT OFFICE 2,019,290

HEATING AND COOLING SYSTEM

Kemper P. Brace, New York, N. Y.

Application April 24, 1933, Serial No. 667,606

7 Claims. (Cl. 257—9)

This invention relates to heating and cooling systems, and more particularly to heating and cooling systems of the absorption type. The present invention is directed to a system of this type which utilizes water as the refrigerating medium, with a solution of a hygroscopic material, such as an alkaline hydroxide, or the salts of lithium, calcium, or similar substances, as the absorbing medium.

The operation of such a system is based upon the physical phenomenon that any volatile liquid can be made to boil at low temperatures by reducing the air pressure upon the surface of the liquid. Thus, by evacuating, at least to a partial extent, the space above a body of water, and constantly removing the vapor, the water can be made to boil at temperatures greatly below the normal boiling point. This principle has found application in the ammonia absorption systems of the type now on the market.

The present invention, in its preferred embodiment, is directed broadly to the provision of a system of this type embodied in a simple, compact and efficient unitary structural device. It is a primary object of the present invention to provide a unitary structure for such a system in which the condenser, evaporator, absorber and concentrator, or boiler, are disposed in vertical alignment, thus reducing the amount of floor space necessary for the installation of such a system, and also reducing friction loss through the system due to the reduction in the length of conduit and piping necessary, and the consequent decrease in angular turns and elbows.

In connection with this feature of compact arrangement, the present invention provides for a finned or extended evaporating surface used for both cooling and heating, and which does not require any changing of the air circuit in order to change from its cooling to its heating function, or vice versa, depending upon the manner in which the system is to be used, thus eliminating the use of complicated damper controls and duct work.

A further feature of the present invention resides in the provision of a plurality of evaporating surfaces providing for a large water surface of very little depth, which is of importance since at low temperatures a small hydrostatic pressure can greatly retard the boiling at the bottom of the liquid, and thus the low boiling point desired can be efficiently maintained.

Further, the present invention contemplates the use of a sealing loop between the condenser and evaporator, thus preventing the flow of non-condensed gases from the condenser to the evaporator, and thus eliminating the use of an expansion valve or similar member between these two parts of the system.

The entire system is preferably enclosed and operates under a partial vacuum maintained either by a vacuum pump or by a mercury jet type of evacuating means. The mercury condenser of the latter type of evacuating means is preferably disposed in the boiler of the system, so that all of the heat required to vaporize the mercury is returned to the boiler, thus maintaining the efficiency of the system at a high point.

Other features of the present invention reside in the disposition of the evaporator above the absorber, and the absorber above the boiler, which allows for gravity flow from the evaporator to the absorber, with no bends or elbows required in the pipe extending therebetween, thus reducing friction and decreasing losses, also for gravity flow of the dilute solution from the absorber into the boiler when the system is shut down, thus preventing crystallization of the concentrated solution in the boiler.

Various other structural features that present additional advantages will be brought out more fully in the following detailed description, which, taken in connection with the accompanying drawings, will disclose to those skilled in the art the particular construction and operation of a preferred form of the invention.

In the drawings:

Figure 3 is a side elevational view of a structure unit embodying the present invention;

Figure 4 is a sectional view taken substantially on the line 4—4 of Figure 6;

Figure 5 is a sectional view taken substantially on the line 5—5 of Figure 3; and Figure 6 is a front elevational view of the unit shown in Figure 3.

Figure 1:
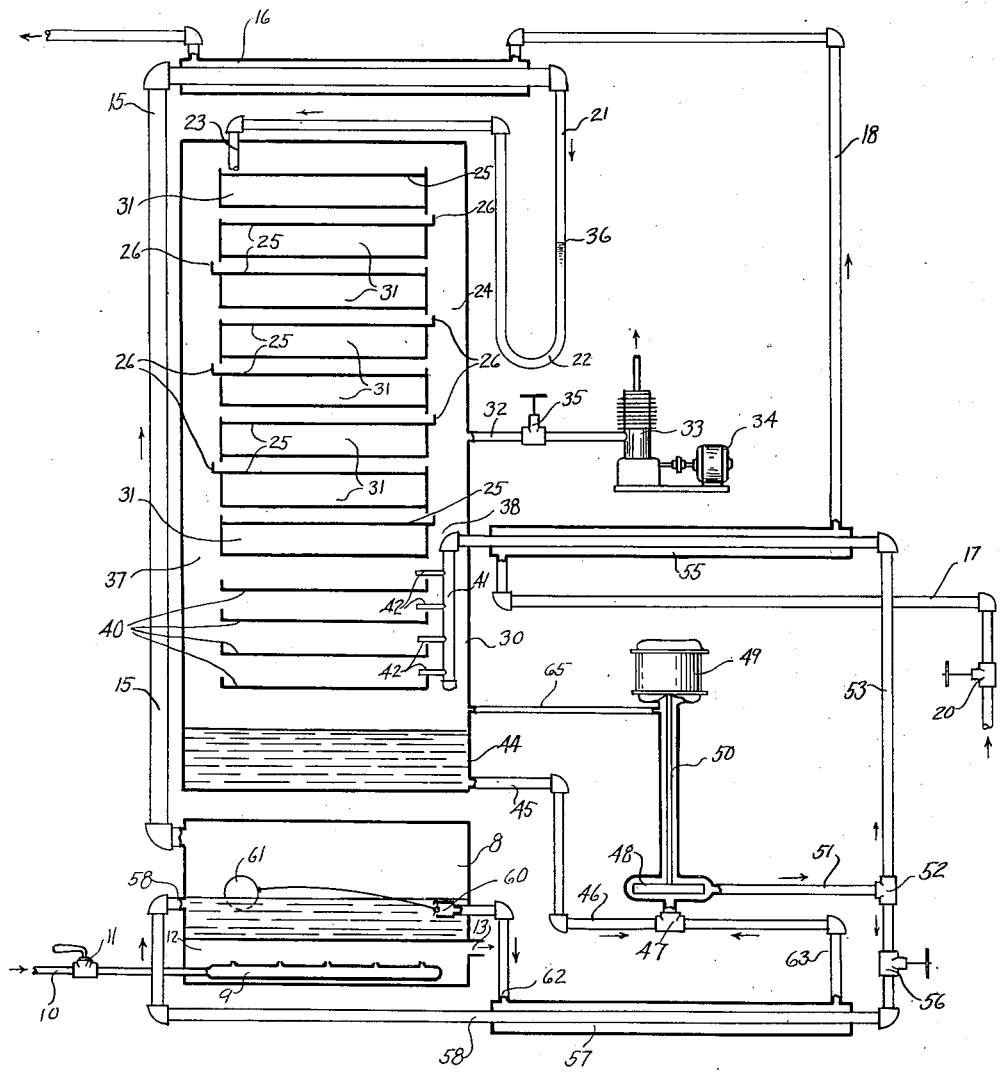
Figure 1 is a diagrammatic view showing the fluid flow cycle of the system of the present invention.

Referring now in detail to the drawings, in Figure 1 I have disclosed schematically the fluid flow cycle of the heating and cooling system embodying the principles of the present invention. In this figure, I have indicated a boiler generally by the reference numeral 8, this boiler being heated by a heater 9, which is shown diagrammatically as a gaseous or fluid fuel heater, although any other desired type of heater may be used. The fuel supply line for this heater is indicated at 10, and the supply of fuel is controlled by the valve 11. The products of combustion escaping from the heating chamber 12 are exhausted through the flue 13 to atmosphere.

The steam produced in the boiler 8 is conducted through the conduit or riser 15 to a condenser 16 disposed above and spaced from the boiler. The condenser 16 is supplied with cooling water through the conduits 17 and 18, the flow of water therethrough being controlled by the valve 20. This may be supplied from any suitable source. The steam is condensed in the condenser 16, and passes downwardly through conduit 21, and through the loop 22 to the inlet 23 of the evaporator unit 24.

In this unit 24 are a plurality of spaced tray members indicated generally at 25, which are placed in vertical alignment, the trays below the uppermost tray being provided with staggered offset edges 26 which provide for a downward flow of the water from the inlet 23 over the surface of the trays into the absorber 30. Below each of these trays is provided an air space 31, through which the air to be heated or cooled is conducted in contact with the exterior surface of the trays 25.

The lower edge of each of the trays 25 seals the upper portion of the air openings or passageways 31, and provides for a hermetically sealed casing within the evaporator 24 whereby the evaporator, together with the absorber unit 30, may be placed under a partially evacuated condition. This is effected by means of the conduit 32 which communicates with the interior of the evaporator casing 24, and which is connected to a vacuum pump 33 operated by the motor 34. A suitable valve 35 controls the evacuation within the chamber 24.

It will be noted that the conduit 21 leading to the inlet 23 is provided with the depending loop 22, which is for the purpose of providing a sealing loop to prevent the conduction of non-condensed gases from the condenser 16 to the evaporator 24. By maintaining a sealing trap of liquid, indicated diagrammatically at 36, within the loop 22, no uncondensed gases can escape from the condenser into the evaporator. It is possible to provide such a loop instead of an expansion valve, due to the fact that the difference in pressure between the condenser 16 and the evaporator 24 does not amount, at a maximum, to more than approximately 18 inches of water.

Due to the evacuated condition within the evaporator 24, the water spreading over the surface of the trays 25 boils at a relatively low temperature, and the water vapor thus produced is drawn downwardly through the openings 37 and 38 into the absorber chamber 30. It is important that this vapor be continuously removed as it is formed, in order to maintain the proper conditions of pressure within the evaporator 24. This is accomplished by providing a plurality of solution trays 40, which are supplied with a hygroscopic solution from the inlet 41, which has the outlet ports 42 directed over each of the trays 40. This solution may comprise an alkali hydroxide, a hygroscopic salt, or other moisture absorbing solutions The solution spreads over the surface of the trays 40 and absorbs the water vapor from the boiling water in the trays 25, and thus maintains the pressure within the evaporator 24 and the absorber 30 substantially constant. This solution, diluted with the absorbed moisture, collects in the bottom portion or sump 44 of the absorber, and is conducted through outlet 45 and conduit 46 to a T connection 47.

From the T connection 47, the solution is forced by means of pump 48, operated by motor 49 through an extended shaft 50, into the pump outlet conduit 51, to a second T connection 52. At this point, the solution is divided, a portion of the solution passing through the pipe 53 and into the solution cooler 55. The solution is cooled in this cooler by means of the water flowing through the pipe 17, which water is later used in the condenser 60. From the solution cooler 55 the solution passes through the inlet pipe 41 and is redistributed over the trays 40. The other portion of the solution, however, is directed downwardly through valve 56 and through the heat interchanger member 57 to the boiler 8, entering the boiler through the conduit 58. In the boiler, the moisture is driven off of the solution, and the concentrated solution is passed through the valve 60, which is controlled by the float 61, which controls the level of the solution within the boiler. The float-controlled valve prevents withdrawal of solution from the boiler below a predetermined level. From the outlet valve 60, the concentrated solution passes through the pipe 62 to the interchanger 57, and from the interchanger 57 through pipe 63 to the T connection 47, where the concentrated solution is mixed with the dilute solution coming from the sump 44 of the absorber 30 and is delivered to the pump 48.

In this manner, at all times a portion of the solution is being forced into the boiler and thereby concentrated, the heat of this solution being transferred in the interchanger 57 to the incoming dilute solution in order to effect a heat saving with respect to the boiler 8. This concentrated solution coming from the boiler is then mixed with a portion of the dilute solution from the absorber and is redelivered to the trays 40 in the absorber. It will be noted that the pump 48 is disposed below the level of the liquid in the sump 44, and thus at all times will be receiving the solution from the sump. At the same time, the motor 49 is disposed, because of the extended shaft 50, above the level of the liquid in the sump. An equalizing pipe 65 is provided for maintaining the pressure in the motor housing the same as the pressure in the absorber 30. It is thus apparent that the cycle is continuous, and may be operated indefinitely.

The moisture evaporated by the boiling of the water in the trays 25 is absorbed into the solution, and is removed from this solution in the boiler 8, and reconducted through the riser 15 and condenser 16, to the trays 25. The evaporator chamber 24 is preferably hermetically sealed, and, after having once been evacuated, the vacuum pump 33 may be shut off, and the evaporator maintained under a partial vacuum. By means of the sealing loop 22, the use of an expansion valve between the condenser and the evaporator is eliminated, and further, a positive means of preventing the flow of non-condensed gases from the condenser to the evaporator is provided.

The trays 25 are preferably provided with downwardly extending fin portions which project into the air spaces 31, in order to present an extended surface to the air passing through these spaces. In this manner, a greater heat transfer rate between the air and the trays can be effected, and thus a greater cooling of the air takes place.

When it is desired to use the system for heating the air, the valve 20 is closed, thus shutting off the flow of cooling water to the solution cooler 55 and to the condenser 16. At the same time, the motor 49 is stopped. The water vapor or steam from the boiler 8 is thus condensed in the evaporator 24, and flows by gravity through the absorber 30 back into the boiler 8. The temperature of the steam from the boiler flowing into the evaporator through the pipe 21 and inlet 23 is substantially higher than the temperature desired in the air, and the condensation of this steam upon the trays 25 serves to heat the air passing into contact with the under surface of the trays through the air spaces 31. This condensation results in the latent heat of vaporization of the steam being given up to the air stream, thus heating the air and condensing the steam. The condensed steam then flows through the passages 37 and 38 into the absorber 30 and down through the sump 44 and the pipes 46 and 63 to the boiler, where it is re-evaporated and again passed to the evaporator 24.

It is thus apparent that either the heating cycle or the cooling cycle can be made continuous, and that no solution or water need be added to the system after it has once been put into operation. The compact arrangement provides the desired efficient operation, reducing friction losses through extensive ducts of piping and the like, and also reducing the spacial requirements of the system.

Figure 2:
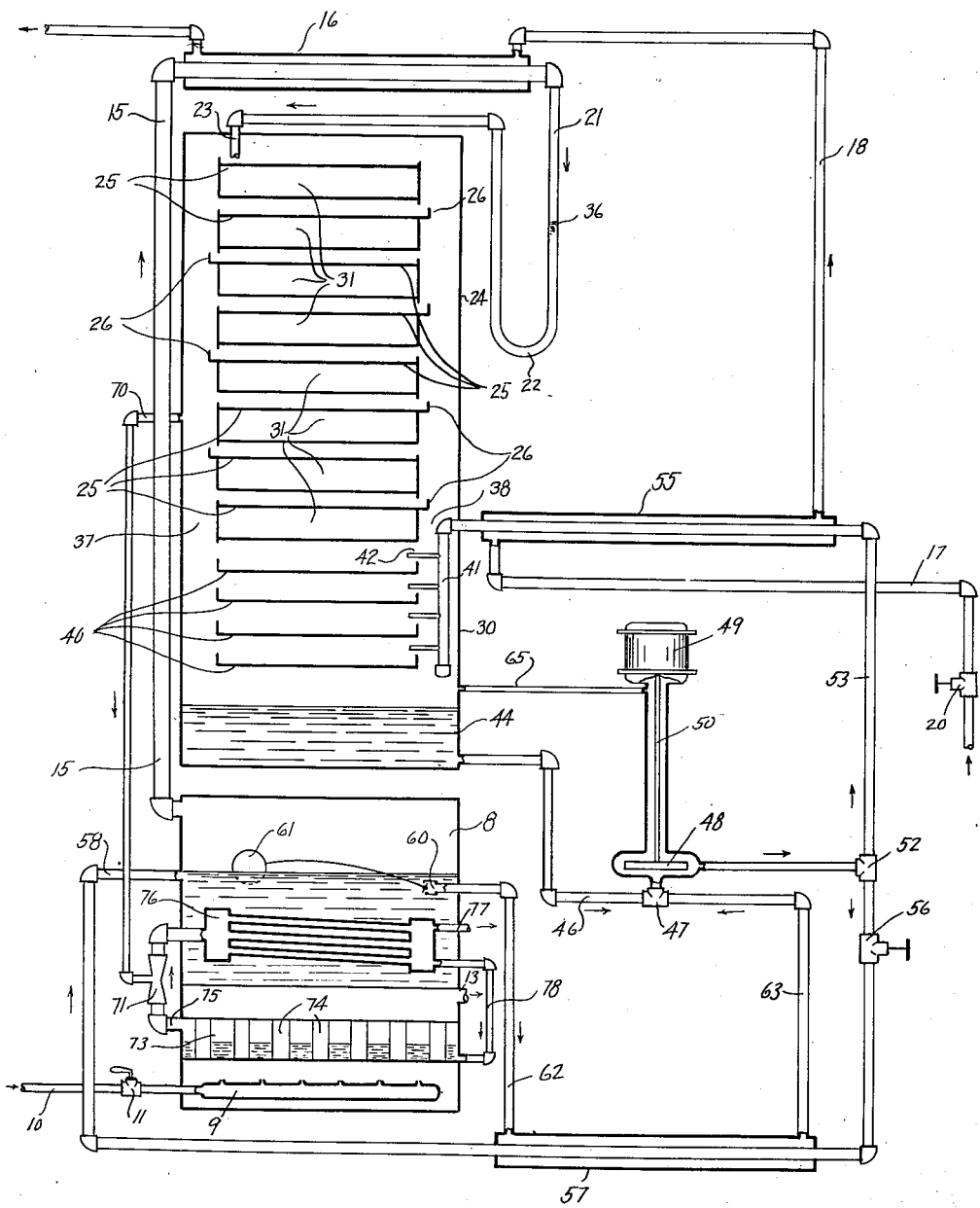
Figure 2 is a diagrammatic view similar to Figure 1 in which a mercury jet type of evacuating means is provided.

Considering now in detail Figure 2, the system shown in Figure 1 is duplicated with the exception of the substitution of a mercury jet type of evacuating system in place of the vacuum pump 33 and motor 34 of Figure 1.

In this embodiment, the evaporator chamber 24 and absorber chamber 30 are evacuated by means of an outlet connection 70 leading to a mercury jet 71. Disposed in the base of the boiler 8' is a mercury vaporizer indicated generally at 73. This vaporizer is provided with vertical passageways 74 extending therethrough allowing the heat from the burner 9 to pass to the lower portion of the boiler 8'. The burned gases pass outwardly through the flue 13'.

The mercury is vaporized in the vaporizer 73, and passes through the outlet 75 into the jet 71. A condenser 76 is placed within the boiler 8', and by the condensation of the mercury vapor therein, draws air from the evaporator 24 and absorber 30 through the outlet 70 and past the jet 71 into the condenser. This air is exhausted through outlet 77. The condensed mercury returns through conduit 78 to the vaporizer 73, and is again vaporized and serves to draw additional air from the chambers 24 and 30.

It will be noted that the condenser 76 is placed in the solution in boiler 8', and therefore all the heat utilized for vaporizing the mercury is returned to the boiler, thus maintaining the efficiency of the system at a high point. In its other respects, the system diagrammatically shown in Figure 2 is identical with the system disclosed in Figure 1, and functions in the same manner as has been previously described.

Referring now in detail to the embodiment of the invention incorporated in Figures 3 to 6, inclusive, this represents the embodiment of the heating and cooling system in a single unitary structural device.

In this embodiment, the device comprises a lower boiler or furnace structure indicated generally at 80, this structure comprising a brick set boiler or the like. The boiler is indicated generally at 8 in Figures 4 and 5. A fire door 81 is provided for conducting either fuel to a burner disposed within the base of the structure 80, or for conducting heated gases or the like from an extraneous source into the boiler chamber. These gases pass through the tube 82 disposed in and surrounded by the solution in the boiler, and are exhausted through the stack 83. This may comprise any usual type of boiler construction, and is only described briefly herein, since it forms no essential part of the present invention. Disposed above the furnace and boiler structure 80 is the absorber chamber 30, which is suitably encased in an insulated housing formed substantially continuous with the furnace 80. Suitable heat insulating material 84 is provided between the walls of the structure 80 and the absorbing chamber 30. This chamber is thus suitably insulated from the heat of the furnace disposed therebeneath.

Disposed within the absorber chamber are the trays 40, previously described, which are preferably supported upon suitable supporting means 86, shown in Figures 4 and 5. These trays are adapted to receive the solution coming from the solution cooler 55 through the pipe 41. Mounted above the absorber chamber 30 is the evaporator 24, which is provided with a plurality of air openings 31, through which the air to be heated or cooled is passed. The trays 25 disposed in the evaporator are provided with downwardly depending fin portions indicated at 88, which are adapted to present large heat transfer surfaces to the air stream passing through the air spaces 31. As will be apparent from Figures 4 and 5, the water passes over the upper surface of the trays 25, in the spaces indicated at 89 in Figure 5, and, due to the low pressure existing within the evaporated chamber 24, boils at a relatively low temperature, thus cooling the air passing through the air spaces 31.

The operation of the device shown in Figures 3 to 6, inclusive, is substantially the same as that described in connection with the diagrammatic flow cycles disclosed in Figures 1 and 2. It is to be noted that the entire unit occupies a minimum of floor space, because of the vertical positioning of the absorber upon the boiler and of the evaporator upon the absorber, with the condenser positioned over the top of the evaporator. Further, this reduces the friction losses in the system, since it reduces the length of conduit and piping necessary for conducting the fluid through the respective cycles, and also reduces the angular turns or elbows, thus decreasing friction losses. Further, the provision of the sealing loop in the pipe 21 eliminates the use of an expansion valve, while preventing the passage of noncondensed gases from the condenser 16 into the evaporator.

The unit may be so arranged that the air passing through the air spaces 31 can be confined within a duct or suitable conveying means for transferring this air to any particular or desired location. Further, when it is desired to change the system from its heating to its cooling function, the only changes necessary in the apparatus are to shut off the motor 49 and stop the flow of cooling water through the solution cooler and condenser. No change of the air circuit is required when the system thus changes its function.

While the invention has been disclosed and described in connection with a specific unitary structural device, it is to be understood that I do not intend to be limited to the exact details of construction shown and described, nor to the particular structural arrangement of the component parts, but only in so far as defined by the spirit and scope of the appended claims.

I claim:

1. In an absorption type heating and cooling system, a boiler, a furnace structure enclosing said boiler, an absorber supported by and insulated from said furnace structure, an evaporator mounted on said absorber and having direct communication therewith, and a condenser mounted on top of said evaporator, the lateral extent of said system being determined by the lateral area of said furnace structure.

2. A heating and cooling apparatus comprising a boiler structure, a condenser receiving steam from said boiler structure, an evacuated casing supporting said condenser and receiving condensed steam therefrom, evaporating means for boiling said condensed steam at low temperatures within said casing, absorbing means directly below said casing and over said boiler structure for removing vapor from said casing, and means disposed within said boiler structure for maintaining said casing evacuated, said boiler structure supporting all of said apparatus and defining the peripheral extent thereof.

3. In a system of the class described, an evaporator, means for supplying said evaporator with condensed steam, means for placing said evaporator under a partial vacuum, said means including a mercury jet vaporizer, and evaporating trays having heat transfer surfaces contacted by an air stream, said trays being alternately staggered in spaced vertical alignment whereby said condensed steam progressively flows from the uppermost tray to the lowermost tray.

4. An evaporator for an absorption type heating and cooling system comprising an evacuated casing, a plurality of vertically spaced evaporating trays in said casing, correspondingly spaced air conduits extending through said casing beneath each of said trays and sealed from the interior of said casing, and heat transfer means projecting from said trays into said conduits.

5. An evaporator for an absorption type heating and cooling system comprising an evacuated casing, a plurality of vertically spaced evaporating trays therein, opposite edges of alternate trays being projected to receive liquid overflowing from the next higher tray, said trays presenting a large lateral liquid surface within said evaporator and being of an individual depth substantially to eliminate any hydrostatic head upon the liquid in said trays.

6. In a system of the class described, a boiler, an evaporator, means for condensing steam from said boiler and conducting it to said evaporator, and means for maintaining said evaporator partially evacuated comprising a mercury vaporizer, a mercury vapor jet, means connected to said jet and affording communication with the interior of said evaporator, and a mercury condenser disposed in said boiler and having means for exhausting gases withdrawn from said evaporator by said jet.

7. In an absorption type heating and cooling system, an evaporator, a condenser, means for passing condensed steam into said evaporator from said condenser, means for evacuating said evaporator to lower the boiling point of the water therein, evaporating surfaces in said evaporator, means for conducting air into exterior surface contact with said surfaces, absorption means for removing vapor from said evaporator, means for circulating said solution through a regenerating and concentrating cycle, said condenser and said circulating means being actuated in order to effect cooling of said air, and being unactuated when it is desired to effect heating of said air.

KEMPER P. BRACE.